United States Patent [19]

Eden et al.

[11] Patent Number: 4,606,034

[45] Date of Patent: Aug. 12, 1986

[54] ENHANCED LASER POWER OUTPUT

[75] Inventors: James G. Eden, Champaign, Ill.; Andrew W. McCown, Los Alamos, N. Mex.; David B. Geohegan, Urbana, Ill.

[73] Assignee: Board of Trustees, University of Illinois, Urbana, Ill.

[21] Appl. No.: 702,547

[22] Filed: Feb. 19, 1985

[51] Int. Cl.[4] ............................................... H01S 3/22
[52] U.S. Cl. ........................................ 372/57; 372/87; 372/92; 372/32; 372/23; 372/39
[58] Field of Search ................... 372/29, 32, 68, 57, 372/60, 86, 87, 97, 23, 39

[56] References Cited

U.S. PATENT DOCUMENTS 4,547,883 10/1985 Cohn et al. ...................... 372/87

FOREIGN PATENT DOCUMENTS 2107512 1/1983 United Kingdom ................ 372/87

OTHER PUBLICATIONS

Taylor et al., "Laser Induced Preconization of a Rare-Gas Halide Discharge"; Opt. Lett., vol. 5, No. 6, Jun. 1980.

Primary Examiner—Léon Scott, Jr.
Attorney, Agent, or Firm—Philip Hill

[57] ABSTRACT

The efficiency of pulsed laser systems is enhanced substantially by injecting a minor amount of radiation energy into the system $\Delta t$ seconds prior to the emergence of the laser pulse. The degree of power enhancement is a function of both radiation wavelength and time delay.

21 Claims, 4 Drawing Figures

ENHANCED LASER POWER OUTPUT

This invention was made with Government support under contract F49620-83-C-0003, awarded by the Air Force Office of Scientific Research, and under grant CPE 82-07868, awarded by the National Science Foundation. The Government has certain rights in this invention.

BACKGROUND OF THE INVENTION

Although the laser was discovered only 25 years ago, its applications in science, medicine and industry have made a significant impact on our society. As a result, the sales of commercial laser systems have increased rapidly and are now at a level of nearly a half billion dollars annually. This explosive growth is typified by the rare gas-halide (RGH) excimer lasers. Although discovered just a few years ago, the sales of excimer laser systems already represent one of the two fastest growing segments of the electro-optics market.

While most of the units sold presently are intended for laboratory use, the engineering sophistication now incorporated into these lasers has made them quite rugged and reliable and they are being increasingly used for industrial processes such as silicon wafer marking and laser annealing of implanted semiconductor layers. Xenon chloride (XeCl) is, by far, the workhorse of the RGH laser family. Its wavelength of 308 nm is ideally suited for "pumping" dye lasers for laboratory use or for the semiconductor applications mentioned above.

One of the main reasons for the popularity of these lasers is the efficiency with which they generate ultraviolet (UV) radiation. Typical discharge pumped, rare gas-halide lasers exhibit a conversion efficiency (stored electrical energy to laser output energy) in the range of 1-3%. While appearing to be small, such efficiencies are, in fact, quite large for UV lasers. Nevertheless, it is the laser's efficiency which primarily determines its size, weight and cost. Therefore, even a modest improvement in the efficiency of such lasers would have tremendous economic implications.

It has been found that the efficiency of a pulsed laser system can be increased by more than 50% by injecting radiation into the system, generally 20 to 200 nanoseconds prior to the emergence of the system's laser pulse. The potential impact of this development is great. For specific laser systems, it now becomes possible to either increase the output power of a laser device of a given size or to decrease system dimensions, weight and cost while maintaining a constant power output.

While broadly applicable to pulsed laser systems, (gaseous, liquid and solid state), the system of this invention finds a preferred utility with the rare gas halide excimer lasers [see, for example, *Excimer Lasers*, 2nd edition, edited by C. K. Rhodes (Springer, 1984)]. It should be noted that this invention is fundamentally different from injection locking, a well-understood phenomenon. For example, the purpose of injection locking is to improve the optical quality of the output beam of a large laser (known as the "amplifier") with radiation from a low power laser "oscillator". This technique involves operating the oscillator and amplifier at essentially the same wavelength. Also, high optical quality laser beams are those that diverge slowly (i.e., at one to three times the diffraction limit) and/or have narrow line widths. If the "seed" laser pulse from the oscillator is injected into the amplifier 10-20 nanoseconds before the amplifier produces its laser pulse, then the high optical quality of the oscillator pulse will be replicated by the amplifier. However, two points need to be emphasized with regard to injection locking:

(1) there is little difference in the output power of the amplifier with or without the "seed" pulse from the oscillator; and (2) the ability to "lock" the amplifier is critically dependent on the time delay between the firing of the oscillator and amplifier (or, equivalently, the generation of the two optical pulses). Time delays greater than roughly 25 ns are ineffective and 15-20 ns is optimum. Consequently, the invention described here cannot be attributed to injection-locking. Typical of injection locking devices is the Model EMG 150 ET excimer laser system manufactured by Lambda Physik GmbH of Goettingen, Federal Republic of Germany.

Many pulsed gas lasers, particularly those that either operate at high pressures or employ strongly-attaching gases, require preionization of the active medium to achieve stable operation. That is, before the main discharge occurs, it is necessary to produce a spatially uniform concentration of $10^7$–$10^9$ electrons per $cm^3$. Otherwise, the discharge will rapidly collapse into an arc. Lasers requiring such preionization generally contain a built-in preionizer that generates (by a spark or corona) incoherent ultraviolet radiation. As it propagates through the gaseous active medium, this radiation photoionizes various atomic and molecular species, thus producing the necessary electrons. A substantial fraction of the radiation produced by a spark preionizer, for example, has wavelengths between 150 and 200 nm. Such photons are sufficiently energetic to ionize most of those atoms and molecules ordinarily necessary for the operation of the laser. The excimer lasers, for example, involve one or more of the rare gases and a halogen-containing molecule. Normally, pulsed lasers also contain trace concentrations of hydrocarbons due to the backstreaming of oil from the vacuum pump, the poor base pressure in the system ($\sim 10^{-3}$ Torr) or from chemical reactions with the laser chamber. In any case, the radiation from the internal preionizer is sufficiently energetic to produce an adequate photoelectron density by ionizing the rare gases, hydrocarbons, etc. without the need to introduce a low-ionization potential impurity into the gas mixture.

Preionization of one laser with radiation from a second laser has also been demonstrated previously. As reported by Taylor, et al., in *Optics Letters*, vol. 5, p. 216 (1980), the external laser radiation (having a wavelength different from that of the "main" laser) improves the uniformity of the active medium.

However, because excimer laser radiation at 193 nm or 248 nm (photon energies of 6.4 and 5.0 eV, respectively) is used to preionize the active medium of a second laser and because the second laser contained no preionizer, the external radiation is not effective as a preionization source unless a readily-ionizable impurity is intentionally added to the gas mixture. Taylor, et al., added flurobenzene to the XeCl gas mixture which *can* be photoionized at 248 nm. Without the fluorocarbon additive, the authors note that the XeCl laser output is approximately the same with external laser preionization as it is with an internal spark array preionizer.

In summary, using the longer wavelength radiation from an excimer laser is effective for preionization only when an impurity (having an ionization potential no greater than the excimer photon energy) is intentionally added to the gas mixture for the second laser. The system of this invention does not involve the addition of an impurity to the gas mixture, significantly enhances the output power of a pulsed laser for time delays much shorter than the smallest one reported by Taylor, et al., (70 ns) and, perhaps most importantly, works best when the wavelength of the external radiation is considerably greater than those studied by Taylor, et al. Therefore, preionization of the second laser by the external radiation plays a minor role in the system of this invention, particularly for external radiation wavelengths exceeding approximately 250 nm.

SUMMARY OF THE INVENTION

This invention relates to pulsed lasers exhibiting a surprisingly enhanced power output, responsive to the injection of a minor amount of radiation into the laser system at a selected, short time interval ahead of the emergence of the laser energy pulse. Particularly illustrative of this invention is the admission of ultraviolet radiation into the resonator cavity of a pulsed excimer laser some 20 to 200 nanoseconds before the enhanced energy pulse. The radiation energy may be generated externally to the laser system, as by a second laser system, or may be generated internally.

This invention additionally relates to a novel and more efficient pulsed laser apparatus, arranged to conveniently permit the internal generation of injection radiation in an otherwise conventional pulsed laser.

The power enhancement achieved by the method of this invention often exceeds 50% of the base pulse energy level, after subtracting the energy invested in the probe pulse. The observed degree of power enhancement depends, in part, upon the wavelength of the injected radiation and upon the time interval between radiation injection and pulse emergence.

DESCRIPTION OF THE INVENTION

The method of this invention relates to a significantly improved power output in a pulsed laser system. This highly desirable result is achieved by the admission of a minor proportion of radiation energy into the pulsed laser system at a selected time interval prior to the normal emergence of the energy pulse therefrom. The increased energy output varies with the wavelength of the radiation energy and with the magnitude of the time interval, often amounting to an improvement of more than 50% over the normal energy output of the laser system, after allowance for the minor proportion of injected radiation energy. Such an increase in efficiency, eminently attractive and desirable in laser systems, permits either the development of more powerful lasers or the more economic production of lasers at existing peak power levels.

The method of this invention is particularly applicable to pulsed excimer laser systems. Such rare gas halide excimer lasers include, for example, the krypton, argon, and xenon fluorides, as well as xenon chloride.

Figure 1:
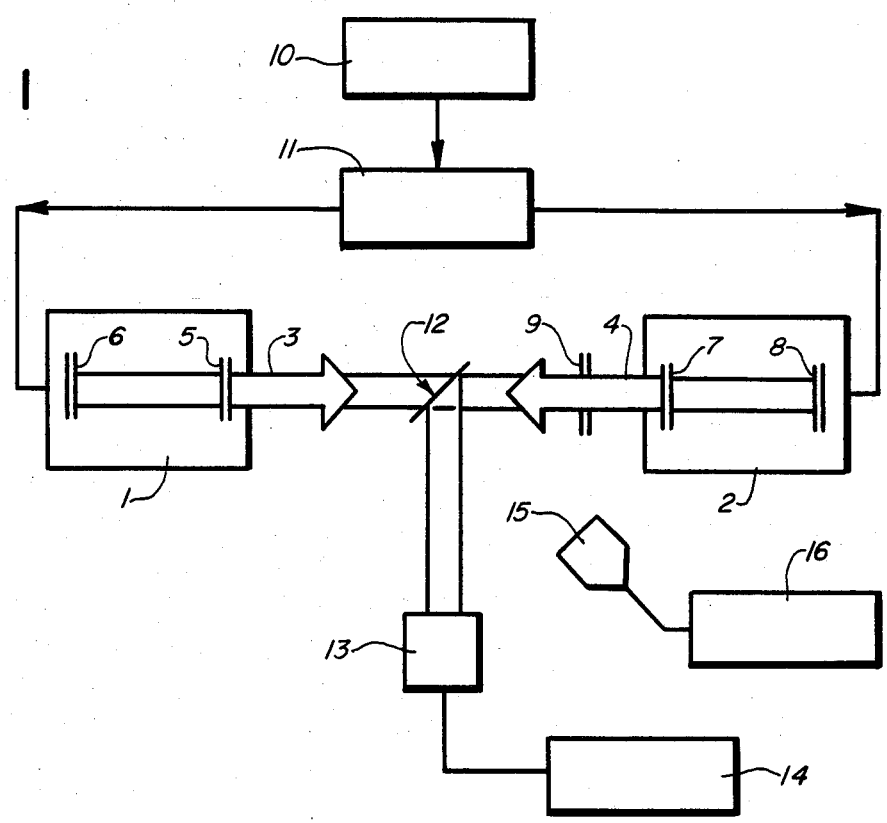
FIG. 1 presents a general schematic representation of one embodiment of this invention.

A schematic diagram of one embodiment of the laser system of this invention is shown in FIG. 1. Excimer lasers 1 and 2 are positioned in an opposing manner with their respective beams 3 and 4 carefully overlapped. Probe laser 1 is fitted with quartz flat 5 and reflector 6 within the optical cavity. Similarly, the output laser 2 is fitted with quartz flat 7 and reflector 8. Preferably, the output laser is a XeCl laser. The beams are spatially filtered by rectangular slit 9, located in front of the output laser 2. The system is activated by trigger generator 10 and digital delay generator 11 which provides for the selected time delay ($\Delta t$).

A quartz flat serves as beamsplitter 12, located roughly equidistant from the lasers, and directs a known fraction of output beam 4 onto pyroelectric energy detector 13 for recording of the beam energy on read-out unit 14. The fluorescence produced when each of pulse beam 3 and output beam 4 strike the beamsplitter 12 is separately viewed and recorded by vacuum photodiode 15 and observed on oscilloscope 16.

The energy injected, as from an external or internal means, may typically amount to from about 2 to about 50 millijoules. When applied from an external source, such a source is conveniently a second pulsed laser system, which may be similar to or identical with the primary laser system. While optimum results have been obtained when the wavelength of the external system is substantially identical to that from the primary system, other available wavelengths are also effective. When the injected radiation energy is generated within the primary laser system, its wavelength is generally identical to that of the primary pulse, although different wavelengths can also be generated internally.

The increased power output is taken as the observed enhancement in the pulse energy divided by the base pulse energy. The increased power can exceed 50% increase over the base pulse energy. Typically, this correlates to an increase in the overall electrical efficiency of the pulsed laser system from about 2% up to about 3% or more.

The maximum increase in energy output is generally dependent upon the extent of the time interval ($\Delta t$), or time delay, between the arrival of the external radiation at the laser system and the emergence of the laser energy pulse. This time delay is generally at least about 20 nanoseconds and may be as much as about 200 nanoseconds, preferably being within the range from about 20 to about 100 nanoseconds, and (for the XeCl laser) most preferably within the range from about 30 to about 50 nanoseconds.

Figure 2:
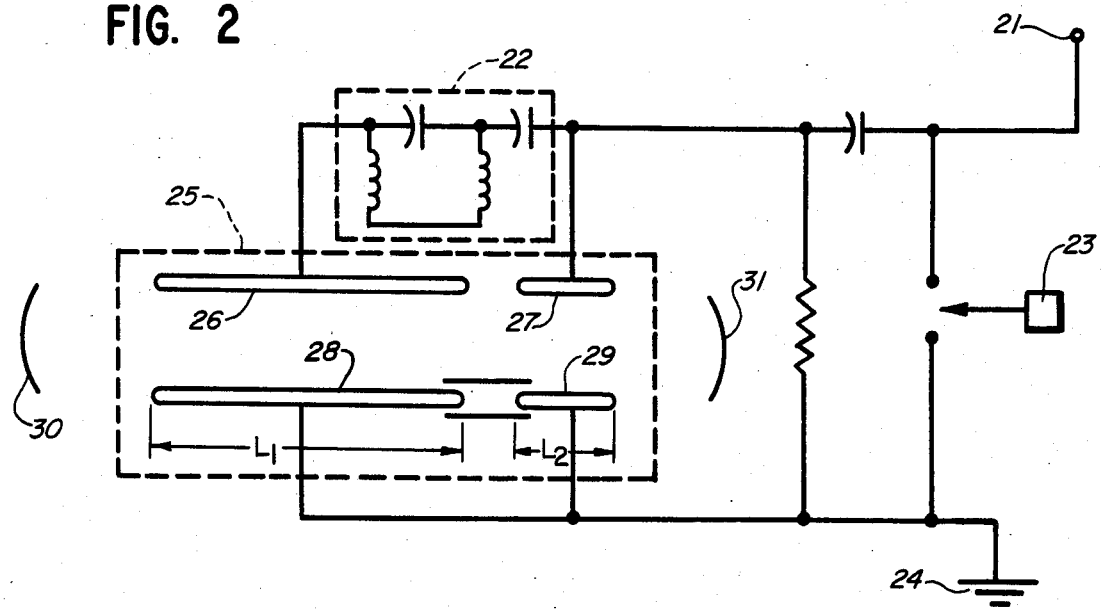
FIG. 2 presents a schematic diagram of one preferred embodiment of this invention.

One preferred embodiment of the power enhancement arrangement of this invention is presented schematically in FIG. 2. In a laser system having a high voltage source 21, electrical delay system 22, thyratron 23, ground element 24 resonator, or amplifier, cavity 25, and mirrors 30 and 31, one or both of the elongated opposed discharge electrodes are modified by separation into two discrete sections 26 and 27 and/or 28 and 29. Preferably the respective lengths of the electrode components, $L_1$ and $L_2$, vary by about a factor of 5 or more.

The respective shorter and longer electrode components are wired and programmed to effect discharge from the shorter discharge electrode component a selected period ($\Delta t$) ahead of the discharge of the longer electrode component. The delay between the two discharges is effected using an electrical delay line. In this manner, increased efficiency is realized in an existing laser system with minimal modification of the overall length and design of the device. Furthermore, this arrangement will assure that the wavelength of the probe radiation is identical to that produced by the second "laser" (or set of electrodes). If preferred, an optical window may be installed between the two electrode sections and the two regions of the laser filled with *different* gases so as to inject a substantially different wavelength into the second laser. Either arrangement will considerably simplify the controls required for the system.

Such an internally generated prior discharge of a minor proportion of radiation energy is particularly applicable to pulsed excimer laser systems, such as the xenon chloride excimer laser. Thus, with this invention, manufacturers would have the option of maintaining the present size of their existing lasers and offering increased power or they could significantly reduce the size of their lasers. The latter would almost certainly lower the cost/unit of the excimer laser and bring the cost within the reach of a larger segment of potential customers in both research and industry.

Secondly, this improvement means that for a given amount of desired output energy one can significantly relax the strain placed on the thyratron and capacitors in the firing loop. In other words, charging voltages can be reduced and the rate of rise of the current (dI/dt) can be increased (i.e., circuit made more inductive) and still obtain the same output energy as before. This will lead to longer lived components, lower maintenance costs and more reliable operation in general.

The method of this invention is generally applicable to pulsed laser systems generating radiation beams in the ultraviolet, visible, or infra-red spectral regions. Similarly, the laser system may comprise solid, liquid, or gas systems.

With particular reference to the XeCl excimer laser, the injection of an ultraviolet laser pulse into the active medium of the XeCl laser, presumably as a "seed" laser pulse, prior to the firing of the latter laser, increases the extraction efficiency of the laser by more than 50%. Significant enhancement is achieved when the auxiliary laser is fired as much as 100 nanoseconds or more prior to the emergence of the final XeCl laser pulse. The increased energy extracted from the XeCl laser more than compensates for the energy injected in the "seed" pulse.

The following examples are illustrative, without limitation, of the method of this invention.

EXAMPLE I

Two excimer lasers, models EMG 101 (XeCl) and EMG 150, supplied by Lambda Physik GmbH, were positioned in an opposing manner, as shown in FIG. 1, and their output beams were carefully overlapped. The EMG 150 laser could be operated on either the ArF, KrF, XeCl or XeF laser transitions at 193, 248, 308 or 351 nm, respectively. Each beam had a 15 ns pulse width and was spatially filtered by a 2.8×1.0 cm² rectangular slit located in front of the EMG 101 XeCl laser, thereby defining the region in the XeCl laser that was affected by the initial laser pulse and preventing the irradiation of the discharge electrodes. A digital delay generator was inserted into the arrangement to permit either laser to be fired first followed at an adjustable time delay later by the other. The jitter in the firing of the two lasers was ±1 ns.

Measurement of the 308 nm pulse energy from the XeCl laser was made by deflecting a known fraction of the XeCl output beam onto a Gen-Tec pyroelectric detector with a calibrated quartz beam splitter. A pyrex filter placed before the energy detector absorbed strongly at 248 nm and at 193 nm, thus permitting the contribution of 308 nm radiation in proportion to the total detected energy to be determined.

Figure 3:
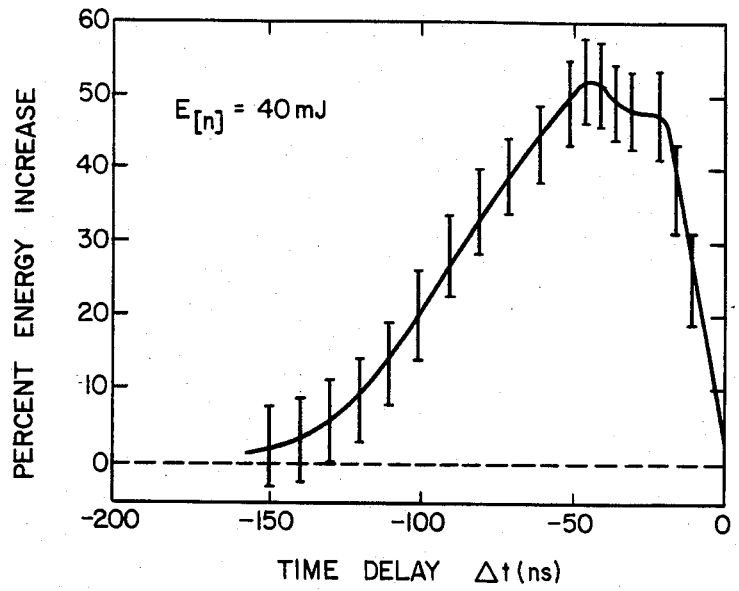
FIGS. 3 and 4 present data illustrative of the effect on energy production of the time delay and of the probe laser energy, respectively.

Power enhancement in the output energy of the XeCl laser was measured for various time delays between a UV laser pulse entering the XeCl laser from the probe laser and the subsequent peak in the XeCl laser pulse. Data presented in Table I and FIG. 3 show the result of injecting 40 mJ of 308 nm radiation into an XeCl laser. It is clear that the maximum enhancement in the output power of the second laser occurs when the time delay between the two is approximately 45 ns. Enhancements in the XeCl laser power are also observed when the "probe" wavelength is 193, 248 or 351 nm but the magnitude of the effect is smaller.

The early time at which the maximum enhancement occurs ($\Delta t = -45$ ns) indicates that the effect cannot be fully attributed to seeding of the XeCl laser resonator by the external "probe" radiation. Photoassociation involving one Xe and one Cl atom and one 308 nm photon to produce an electronically excited XeCl molecule may be responsible for this effect. Preionization of the laser medium by the initial pulse appears to play only a minor role.

EXAMPLE II

Figure 4:
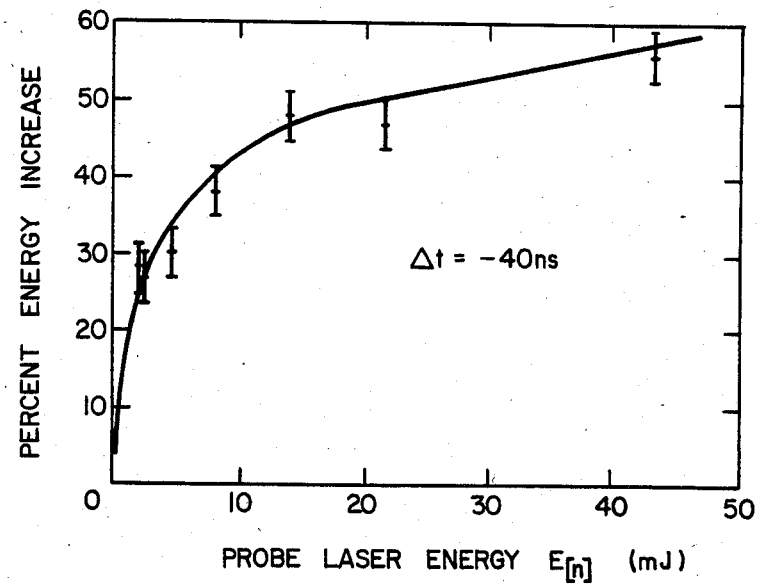

The laser arrangement and procedure of Example I was followed, except that the energy injected from the probe laser was varied (by placing quartz flats in the beam path) at a fixed time delay of $-45$ ns. Data presented in Table II and FIG. 4 indicate a definite dependence of the enhancement upon the magnitude of the injected energy.

EXAMPLE III

The procedure of Example I was followed, with injection of energy from ArF, KrF, and XeF lasers into the XeCl laser.

Injection of radiation (193 nm) from the ArF laser at the 35 mJ energy level led to a maximum enhancement of the XeCl laser output energy of 23% that occurred when the probe radiation preceded the XeCl laser pulse by $-80$ to $-175$ ns.

When employing radiation (248 nm) from the KrF laser, the maximum enhancement was 25% and the pattern was very similar to that observed for the ArF laser.

When employing radiation (351 nm) from the XeF laser, with the pulse energy maintained at 125 mJ, the maximum enhancement was 15% at a time delay of $-100$ ns.

TABLE I

Effect of Time Delay on Power Output[a]

| Time Delay (ns) | Energy Output (mJ) | Enhanced Output (mJ) | Enhanced Output (%) |
|---|---|---|---|
| 10 | 87.5 | 17.5 | 25 |
| 15 | 95.9 | 25.9 | 37 |
| 20 | 102.9 | 32.9 | 47 |
| 30 | 103.6 | 33.6 | 48 |
| 35 | 104.3 | 34.3 | 49 |
| 40 | 105.7 | 35.7 | 51 |
| 45 | 106.4 | 36.4 | 52 |

TABLE I-continued
Effect of Time Delay on Power Output[a]

| Time Delay (ns) | Energy Output (mJ) | Enhanced Output (mJ) | Enhanced Output (%) |
|---|---|---|---|
| 50 | 104.3 | 34.3 | 49 |
| 60 | 100.1 | 30.1 | 43 |
| 70 | 97.3 | 27.3 | 39 |
| 80 | 93.8 | 23.8 | 34 |
| 90 | 89.6 | 19.6 | 28 |
| 100 | 84.0 | 14.0 | 20 |

[a]Enhancement in output power of an XeCl laser when 40 mJ pulse of 308 nm radiation is injected with a selected time delay before the XeCl pulse appears (Δt = 0). The energy output of the XeCl laser in the absence of any probe energy is 70 mJ.

TABLE II
Effect of Probe Energy on Power Output[a]

| Probe Energy (mJ) | Energy Output (mJ) | Enhanced Output (mJ) | Enhanced Output % |
|---|---|---|---|
| 1.9 | 89.6 | 19.6 | 28 |
| 2.2 | 88.9 | 18.9 | 27 |
| 4.4 | 91.0 | 21.0 | 30 |
| 8 | 96.6 | 26.6 | 38 |
| 14 | 103.6 | 33.6 | 48 |
| 21 | 102.9 | 32.9 | 47 |
| 43 | 109.2 | 39.2 | 56 |

[a]Enhancement in output power of an XeCl laser as a function of the "probe" pulse at 308 nm, with time delay fixed at 45 nanoseconds. The energy output of the XeCl laser in the absence of any probe energy is 70 mJ.

We claim:

1. In a pulsed laser system having substantially no readily ionizable additive material therein and, including a resonator cavity, the improvement comprising means associated with said cavity for injecting a minor proportion of radiation energy into an excimer laser at a selected time interval prior to the emergence of a laser pulse therefrom, which interval exceeds 20 nanoseconds; such that a substantial enhancement of the energy of the emergent laser pulse is achieved.

2. The system of claim 1 wherein the minor proportion of radiation energy is injected into the resonator cavity of said pulsed laser system.

3. The system of claim 1 wherein the wavelength of the injected radiation energy is substantially identical to the wavelength of the laser energy pulse.

4. The pulsed laser system of claim 1 wherein the minor proportion of radiation energy is insufficient to achieve substantial pre-ionization.

5. The system of claim 1 wherein the pulsed laser is an excimer laser.

6. The system of claim 5 wherein the excimer laser is selected from the class consisting of argon fluoride, krypton fluoride, xenon fluoride, and xenon chloride lasers.

7. The system of claim 5 wherein the excimer laser is a xenon chloride laser.

8. The system of claim 1 wherein the selected time interval is within the range from about 20 to about 200 nanoseconds.

9. The system of claim 8 wherein the selected time interval is included within the range from about 20 to about 100 nanoseconds.

10. The system of claim 9 wherein the selected time interval is within the range from about 30 to about 50 nanoseconds.

11. The system of claim 1 wherein the pulsed laser is a xenon chloride excimer laser and the selected time interval is about 45 nanoseconds.

12. The system of claim 1 wherein the minor proportion of radiation energy is within the range from about 2 to about 50 millijoules.

13. The system of claim 1 wherein the minor proportion of injected radiation energy is generated externally to the pulsed laser system.

14. The system of claim 1 wherein the minor proportion of injected radiation energy is generated within the pulsed laser system.

15. In a pulsed laser apparatus, including, in a resonator cavity, elongated, opposed discharge electrodes, the improvement comprising: separating at least one of said opposed discharge electrodes into a longer electrode component and a shorter electrode component for use in the substantial absence of readily ionizable additive material; and including programming means for effecting the discharge of the shorter electrode component to occur at a selected time interval prior to the discharge of the longer electrode component.

16. The apparatus of claim 15 wherein the pulsed laser is an excimer laser.

17. The apparatus of claim 16 wherein the excimer laser is a xenon chloride laser.

18. The apparatus of claim 15 wherein the selected time interval is programmed within the range from about 20 to about 100 nanoseconds.

19. The apparatus of claim 15 wherein only one of the opposed discharge electrodes is separated into a longer electrode component and a shorter electrode component.

20. The apparatus of claim 15 wherein the resonator cavity contains opposed pairs of longer electrode components and of shorter electrode components, each such pair associated with programming means for discharging said shorter opposed electrode components at a selected time interval prior to the discharge of the opposed longer electrode components.

21. The apparatus of claim 20 additionally including an optical window installed intermediate the opposed pairs of longer electrode components and shorter electrode components to define a first laser region and a second laser region respectively, whereby the two laser regions may be filled with different gases such that the wavelength of the second laser differs substantially from the wavelengths of the first laser.

* * * * *